United States Patent
Hoff

(10) Patent No.: US 11,386,071 B2
(45) Date of Patent: *Jul. 12, 2022

(54) PROCESSING CONSISTENCY VALIDATIONS OF CONFIGURATION DATA

(71) Applicant: SAP SE, Walldorf (DE)

(72) Inventor: Roland Hoff, Walldorf (DE)

(73) Assignee: SAP, SE, Walldorf (DE)

( * ) Notice: Subject to any disclaimer, the term of this patent is extended or adjusted under 35 U.S.C. 154(b) by 168 days.

This patent is subject to a terminal disclaimer.

(21) Appl. No.: 16/855,578

(22) Filed: Apr. 22, 2020

(65) Prior Publication Data

US 2021/0334265 A1 Oct. 28, 2021

(51) Int. Cl.
G06F 16/23 (2019.01)
H04L 41/0869 (2022.01)

(52) U.S. Cl.
CPC ...... *G06F 16/2365* (2019.01); *H04L 41/0869* (2013.01)

(58) Field of Classification Search
CPC ............. G06F 16/2365; G06F 16/0869; G06F 16/24573
USPC ....................................................... 707/690
See application file for complete search history.

(56) References Cited

U.S. PATENT DOCUMENTS

| | | | |
|---|---|---|---|
| 8,819,068 B1 * | 8/2014 | Knote ................. | G06F 16/2282 707/790 |
| 9,009,110 B2 | 4/2015 | Brunswig et al. | |
| 2006/0015839 A1 * | 1/2006 | Owens ...................... | G06F 8/20 717/110 |
| 2006/0293935 A1 * | 12/2006 | Tsyganskiy ............... | G06F 8/34 714/48 |
| 2010/0228764 A1 | 9/2010 | Sallakonda et al. | |
| 2012/0265726 A1 * | 10/2012 | Padmanabhan ....... | G06F 16/214 707/602 |
| 2016/0094681 A1 * | 3/2016 | Wu ........................ | H04L 67/02 709/203 |
| 2020/0364205 A1 * | 11/2020 | Novotny ............. | G06F 16/2365 |

OTHER PUBLICATIONS

Formally Prove Model Properties on Data, http://www.ovado.net/.

* cited by examiner

*Primary Examiner* — James Trujillo
*Assistant Examiner* — Fariborz Khoshnoodi
(74) *Attorney, Agent, or Firm* — Mintz Levin Cohn Ferris Glovsky and Popeo, P.C.

(57) ABSTRACT

Configuration data characterizing configuration information of at least one application process executing on a target system is received. The configuration data includes at least one first table and at least one second table upon which the first table depends. The receiving is performed prior to transmission of the configuration data to the target system for application of the configuration data to the target system. At least one validation definition including a header and table elements specifying a dependency of the first table on the second table is determined using the configuration data. Whether to validate the configuration data to ensure consistency within the target system is determined using the at least one validation definition. The determining whether to validate includes determining to validate the configuration data in response to determining that the second table has been modified. Related apparatus, systems, techniques and articles are also described.

20 Claims, 12 Drawing Sheets

FIG. 7A

Change View "Define Reasons for Rejection for Sales Documents":

New Entries

| Rejection Reason | Output | Open Resource Item | No Billing | Statistics | Description |
|---|---|---|---|---|---|
| 00 | | | | | Assigned by the System (Internal) |
| 12 | | | | | Technical Change |
| 56 | | X | | | Customer not eligible |
| 57 | | | | | Warranty period expired |
| 58 | | X | | | Other compensation |

710

Change View "Reason for rejection depend on order type and sales org":

New Entries

Reason for rejection depend on order type and sales org

| SaOrg | SDOrg | Rj | Description |
|---|---|---|---|
| 1010 | | 01 | Order cancelled due to Error |
| 1010 | | 56 | Damaged by customer |
| | | 77 | Rejected by Approver |

↑ ↑ ↑
Sales   Sales          Rejection
Document Organization  Reason
Type

Example: Generic FK Validation Definition:
Validate assigned Rejection Reasons to Sales Document Types / Organizations

Validation Definition Header

| Validation ID | Description | Category | Type |
|---|---|---|---|
| V_FK_SLS_REJ-RSN | Validate assigned Rejection Reasons to Sales Document Types / Organizations | generic | FK |

Validation Definition Field Element

| Validation ID | Configuration Table | Relevance | Validation Field |
|---|---|---|---|
| V_FK_SLS_REJ_RSN | TVAG_AUART_VKO | primary | ABGRU |
| V_FK_SLS_REJ_RSN | TVAG | secondary | ABGRU |

FIG. 9A

Example Validation Definition:
Validate Document Type in Settings for calling Global Trade Services

| Validation ID | Description | Category | Type |
|---|---|---|---|
| V_SC_GTS_01 | GTS Setting: Validation on Document Type | specific | |

| Validation ID | Configuration Table | Field | Relevance |
|---|---|---|---|
| V_SC_GTS_01 | /SAPSLL/TLER3B | | primary |
| V_SC_GTS_01 | TVAK | | secondary |
| V_SC_GTS_01 | TVLK | | secondary |
| V_SC_GTS_01 | TVFK | | secondary |
| V_SC_GTS_01 | T161 | | secondary |
| V_SC_GTS_01 | T156Q | | secondary |

FIG. 9B

PROCESSING CONSISTENCY VALIDATIONS OF CONFIGURATION DATA

TECHNICAL FIELD

The subject matter described herein relates to processing of consistency validations of configuration data.

BACKGROUND

In communications or computer systems, a configuration of a system can refer to the arrangement of each of its functional units, according to their nature, number and chief characteristics. Often, configuration pertains to the choice of software and parameters that affect or control their functioning and inter-relations. Along with its architecture, the configuration of a computer system affects both its function and performance.

SUMMARY

In an aspect, configuration data characterizing configuration information of at least one application process executing on a target system is received. The configuration data includes at least one first table and at least one second table upon which the first table depends. The receiving is performed prior to transmission of the configuration data to the target system for application of the configuration data to the target system. At least one validation definition including a header and table elements specifying a dependency of the first table on the second table is determined using the configuration data. Whether to validate the configuration data to ensure consistency within the target system is determined using the at least one validation definition. The determining whether to validate includes determining to validate the configuration data in response to determining that the second table has been modified. The determination of whether to validate the configuration data is provided.

One or more of the following features can be included in any feasible combination. For example, the determining whether to validate can include: determining a delta between the received configuration data and last validated configuration data; selecting first validations where a respective first table of configuration data is in scope; selecting, from the selected first validations, second validations that are relevant from the first table, the second table, and the delta between the received configuration data and last validated configuration data. Second validations can be relevant when they include dependent tables. The determining whether to validate can include: determining a delta between the received configuration data and last validated configuration data; selecting first validations where a configuration table from the validation definition is in a set of configuration tables characterized by the delta between the received configuration data and last validated configuration data; and selecting second validations from the first validation and which include a respective first table of a respective validation definition that is included in the received configuration data.

The validation definition can characterize a type of validation as associated with a foreign-key relation or an obligatory field, and the validation definition can characterize a relevance of the at least one first table as primary and the at least one second table as secondary. The at least one first table can include key fields and non-key fields as column names and the configuration information as records in the at least one first table.

The at least one application process can include an application business process and the target system is executing a plurality of application business processes. The receiving, the determining of the at least one validation definition, and the determining of whether to validate the configuration data can be performed by a configuration consistency validation processor forming part of a business configuration framework that includes an associated persistency of all configuration data of the target system. The business configuration framework providing consistency of configuration data across all application business processes in an enterprise software system. The configuration data can be validated based on the determination of whether to validate the configuration data. The configuration data can be deployed to the target system. The at least one first table can include a foreign-key relationship with the at least one second table.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 7A is a screen shot of a business management system that enables a user to define reasons for rejection of a sales document;

FIG. 7B illustrates an example validation definition;

FIG. 9A illustrates an example screenshot from enterprise business management software system;

FIG. 9B illustrates another example validation definition; and

Like reference symbols in the various drawings indicate like elements.

DETAILED DESCRIPTION

Figure 1:
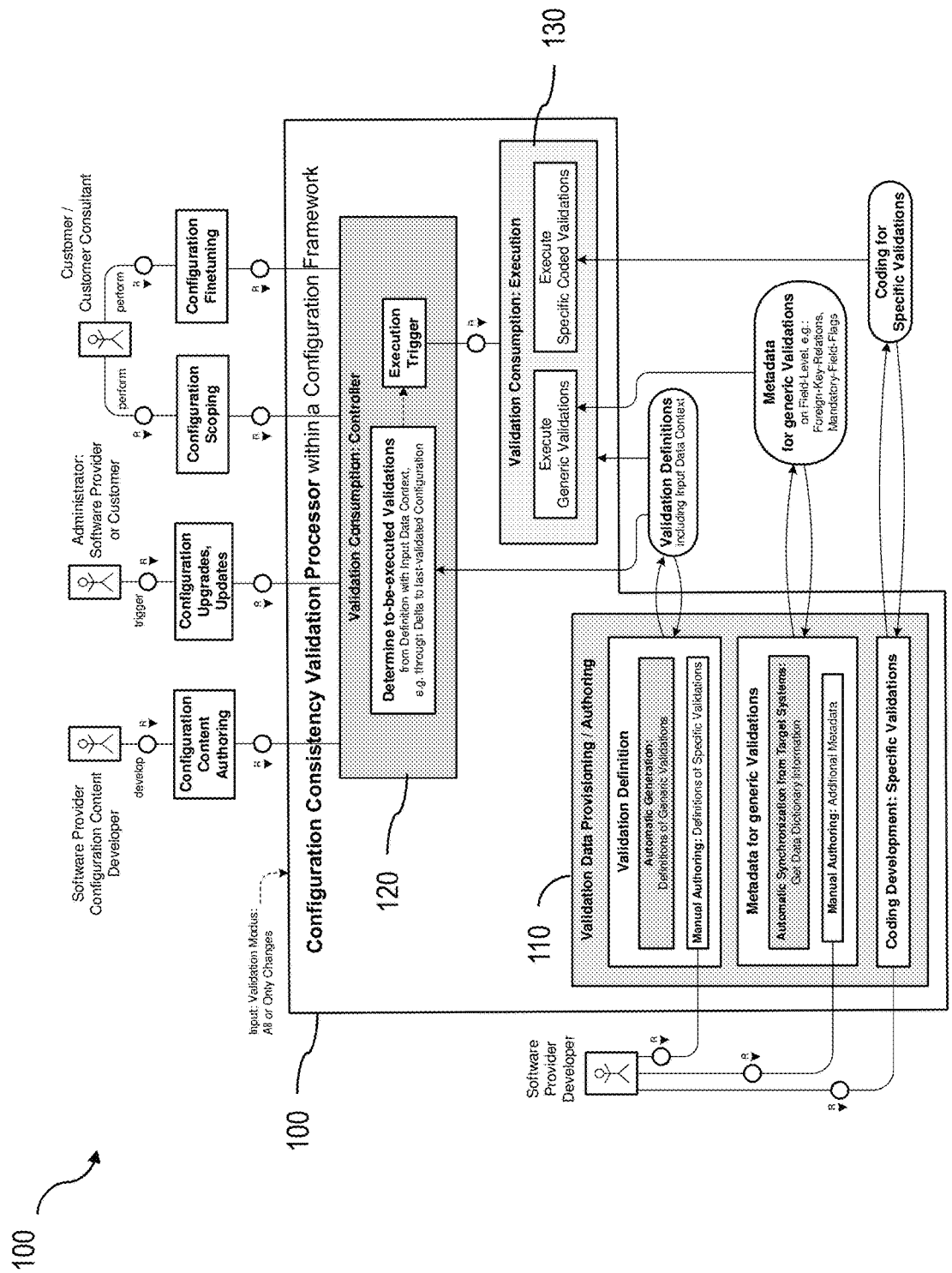
FIG. 1 is a system block diagram of an example configuration consistency validation processor within a configuration framework according to some aspects of the current subject matters.

Together with the move of business software into the cloud, the expectation of customers (e.g., companies) for simplification has increased and is expected to continue to increase. This expectation includes the handling of business configuration data, which can be often quite complex. For example, the SAP business suite on premise (provided by SAP AG of Waldorf, Germany) can include about 20,000 configuration tables.

To manage such large amounts of configuration data within a configuration data network, configuration frameworks can be established. In an example a configuration framework can typically hold and store all configuration data in its own persistency, in parallel with the application persistency of the configuration data. The application persistency of the configuration data can include the persistency from where the applications are reading the configuration data during the execution of a business processes. In the case that several business software products are used or shall be used, which is also quite typical for big companies, such configuration frameworks are established to be central systems to hold and store all configuration data of all business software products which are offered to customers and which are typically integrated to each other.

But with the large number of configuration tables and complexity of enterprise software systems it can be challenging to provide consistency across all business configuration processes in a modern cloud business software system. For example, updates or upgrades may be made to some configurations, resulting in changes made to those configurations, which if not validated can cause errors and unintended function of the business configuration processes.

Some implementations of the current subject matter can include a business configuration framework that can manage configuration consistency through a configuration consistency validation processor to ensure this consistency before the configuration data is applied to the customer target systems (e.g., customer application systems), where application business processes are or will be running. In some implementations, the current subject matter can receive configuration data, for example, at a test or development system, and determine a validation definition for the configuration data. Using the validation definition, some implementations of the current subject matter can determine whether to validate the configuration data to ensure consistency within a target system. This can be performed prior to the configuration data being deployed to the target system. By utilizing such a configuration consistency framework, consistency can be ensured in the target system without requiring validation checks of all configuration data for a given system.

In more detail, one approach to simplifying the complex handling of business configuration data can include software providers providing well-proven pre-configuration structured by re-usable building blocks and building scope items out of the building blocks so that the customers can scope the pre-configuration by selecting the scope items. Furthermore, the software provider can provide scope-options connected to scope items, where decisions can be taken for a selected scope item, which is reflected then in the associated pre-configuration. Scope options may be exclusive or additive.

Then, after scoping, the customer can provide a detailed configuration, which is often called "fine tuning" and which is based on the pre-configuration from the scoping. Starting fine tuning with a well-proven pre-configuration can be considered as a simplification.

Pre-configuration data can be and is often the subject of upgrades or updates, which are provided to the customers. There are various reasons for upgrades or updates, such as extensions of a pre-configuration due to growing business software or providing more pre-configuration for existing business software, leading to additional scope items, additional scope options in existing scope items, and additional pre-configuration data in existing scope items, for example, for existing scope options. Extensions are typically not applied automatically to the customer systems, but they are subject of required customer adaptation processes, where the customer needs to decide which extensions shall or shall not be applied. Another example of a reason to change a pre-configuration can include corrections to a pre-configuration, perhaps necessitated by mistakes in existing pre-configuration data. Corrections are typically applied to the customer systems.

Across all processes of configuration data, the consistency of the data is a pre-requisite for correctly working business processes (e.g., working as expected from the customers), which are controlled by the configuration data. The processes of configuration data can include authoring of the pre-configuration data from the developers of the software provider including extensions and corrections of these data, which can be applied to the customer systems during upgrades, updates or customer adaptation processes; scoping from the customers; fine tuning from the customers; and applying upgrades, updates or customer adaptation processes to the customer systems.

In big configuration data networks, like in some enterprise management systems, there is a large number of consistency validations. Consistency validations can be classified as generic consistency validations (e.g., consistency validations based on foreign-key relations and validations on obligatory fields); and specific coded consistency validations.

Accordingly, as noted above, it can be challenging to provide consistency across all business configuration processes in modern cloud business software. Some implementations of the current subject matter include a business configuration framework, which manages the pre-configuration, the scoping and the fine tuning, and the upgrade and update processes, and can also manage the configuration consistency through a "configuration consistency validation processor" to ensure this consistency before the configuration data is applied to the customer target systems (e.g., customer application systems), where the application business processes are or will be running.

In some implementations, a business configuration framework includes its own generic storage and persistency of all configuration data. The configuration data can be formalized through and converted into configuration tables, with key fields and non-key fields as names of columns and the according configuration data as records in the rows of the tables.

Some implementations of the current approach include specifying validation definitions with input data context, which allows a fast and generalized determination of the to-be-executed validations, and the automatic generation of the validation definitions for generic validations.

FIG. 1 is a system block diagram of an example configuration consistency validation processor 100 within a configuration framework according to some aspects of the current subject matters. The configuration consistency validation processor 100 includes a validation data provisioning/authoring module 110, a validation consumption controller 120, and a validation consumption execution module 130. As described more fully below, the validation data provisioning/authoring module 110 can determine validation definition, determine metadata for generic validations, and provide for specific validations for coding development. The validation consumption controller 120 can receive the validation definitions and determine to-be-executed validations. The validation consumption execution model 130 can execute the to-be-executed validations. The example configuration consistency validation processor 100 can ensure consistency of a target system.

Figure 2:
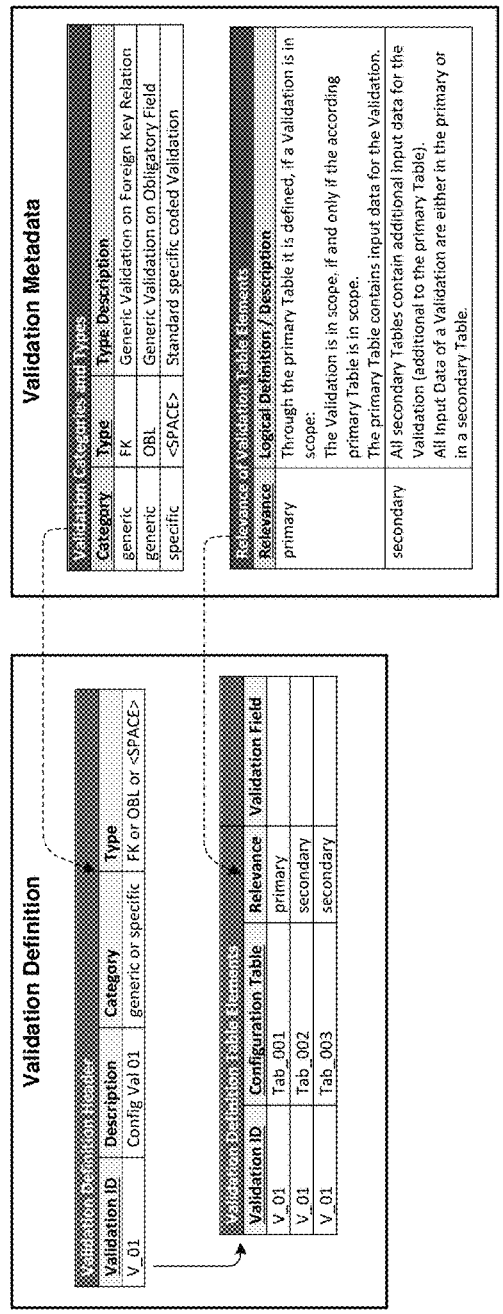
FIG. 2 illustrates an example validation definition, which includes metadata.

FIG. 2 illustrates an example validation definition 200, which includes metadata 210. The validation definition 200 includes configuration input tables as table elements and metadata. The table elements include a column for relevance, which enables the determination of to-be-executed validations.

Figure 3A:
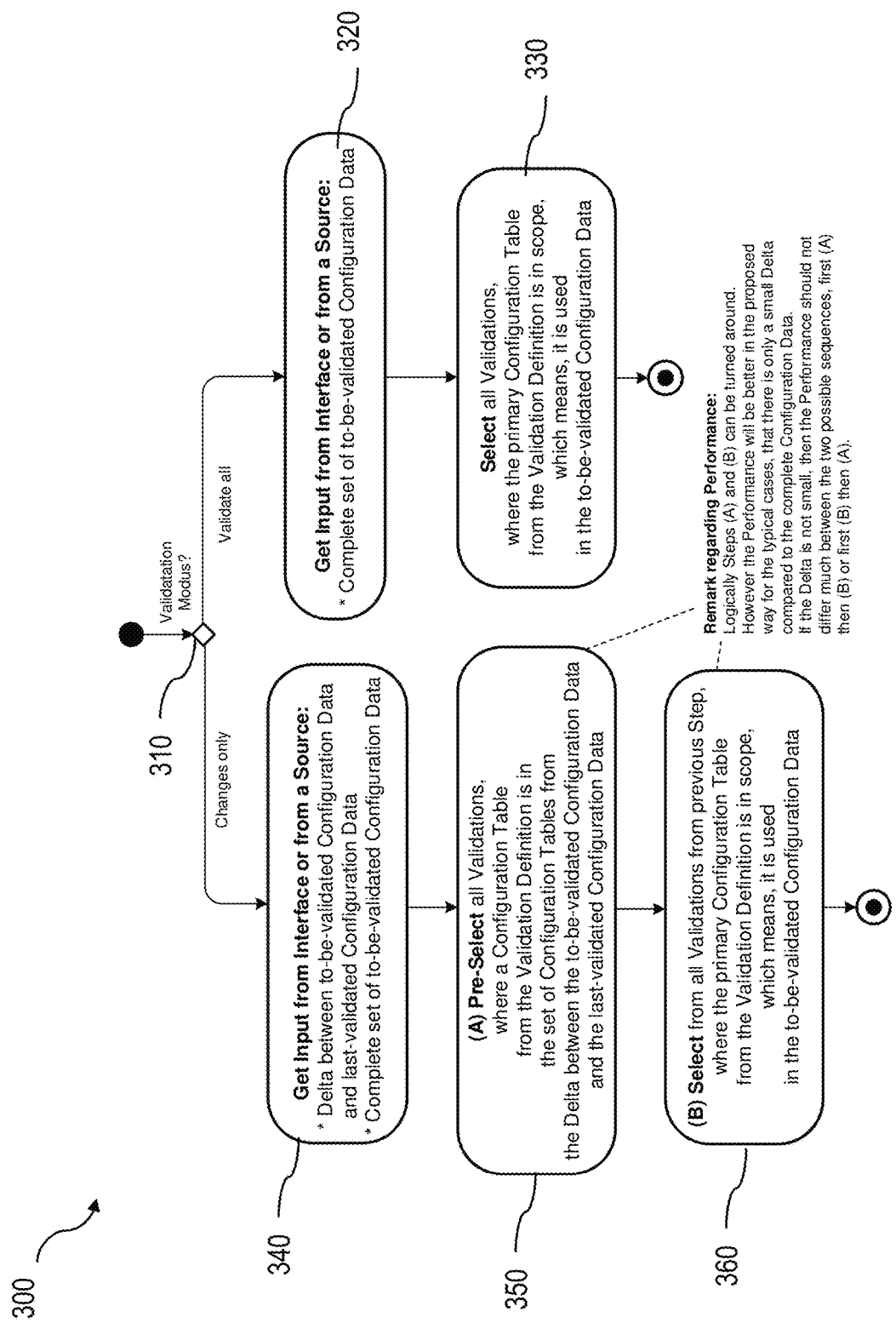
FIG. 3A is a process flow diagram illustrating an example process of automatic generation of validation definitions according to some aspects of the current subject matter.

FIG. 3A is a process flow diagram illustrating an example process 300 to automatically generate validation definitions according to some aspects of the current subject matter. At 310, it is determined whether all configurations are to be validated or only changes to configurations. If all configurations are to-be-validated, then at 320, a complete set of to-be-validated configuration data can be obtained, for example, from an interface or from another source. At 330, all validations can be selected where the primary configuration table from the validation definition is in scope, for example, is used in the to-be-validated configuration table.

If only changes are to be validated, at 340, a delta between to-be-validated configuration data and last-validated configuration data and complete set of to-be-validated configuration data can be determined or obtained, for example, input can be obtained from an interface or a source. At 350, all validations can be preselected, where a configuration table from the validation definition is in the set of configuration tables from the delta between the to-be-validated configuration data and the last-validated configuration data.

At 360, all validations from step 350 where the primary configuration table from the validation definition is in scope (e.g., is used in the to-be-validated configuration data) can be selected. By validating only changes to configuration data and not the entirety of all configuration data within a system, less configuration data is validated thereby requiring fewer computing resources to validate. And by selecting validation definitions that are in scope, the current subject matter can ensure consistency of configuration data in the target system.

Figure 3B:
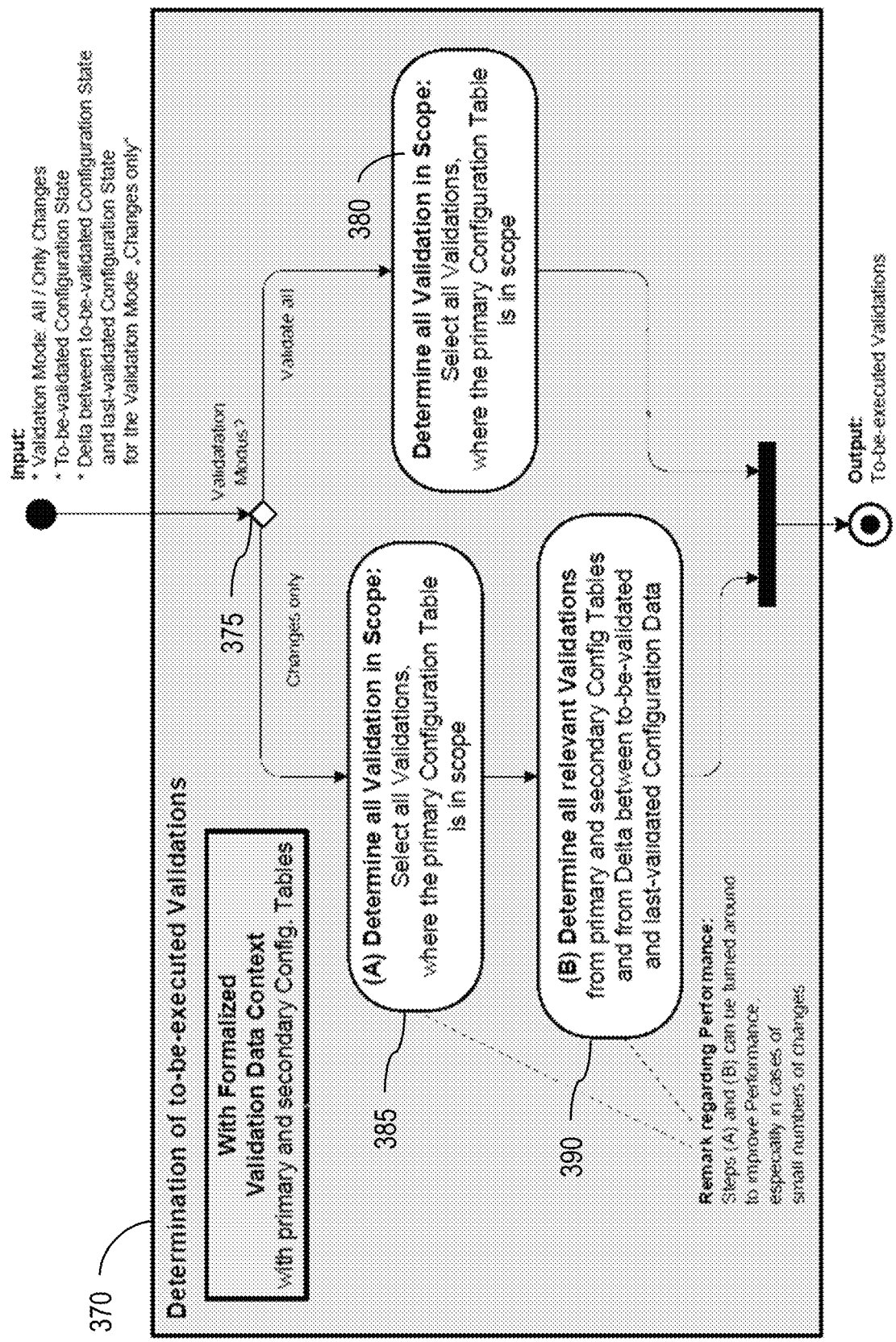
FIG. 3B is a process flow diagram illustrating an example process of determining whether to validate configuration data (e.g., determine to-be-executed validations) according to some aspects of the current subject matter.

FIG. 3B is a process flow diagram illustrating an example process 370 of determining whether to validate configuration data (e.g., determine to-be-executed validations) according to some aspects of the current subject matter. At 375, it is determined whether all configurations are to be validated or only changes to configurations. If all configurations are to-be-validated, then at 380, all validations that are in scope can be determined by at least selecting all validations where the primary configuration table is in scope.

If only changes are to be validated, then at 385, all validations in scope can be determined by at least selecting all validations where the primary configuration table is in scope. At 390, all relevant validations can be determined by at least using primary and secondary configuration tables and from a delta between to-be-validated and last-validated configuration data.

With respect to foreign-key (FK) relations, in some implementations, only simple FK-Relations are considered as generic validations in detail. Further types of FK-Relations can be considered more complex, and in some implementations can be treated as specific coded validations. These more complex FK-relations can include N-tary FK-Relations, FK-Relations with restriction conditions on the check table, multi-level FK-Relations, conditional FK-Relations, where the check table is determined dynamically in dependency of a value of another control field in the foreign-key-table. For example, the validation example described below can be considered a validation of a conditional FK-Relation (Case D) together with restriction conditions on the check table (case B), and can be coded specifically.

Figure 4A:
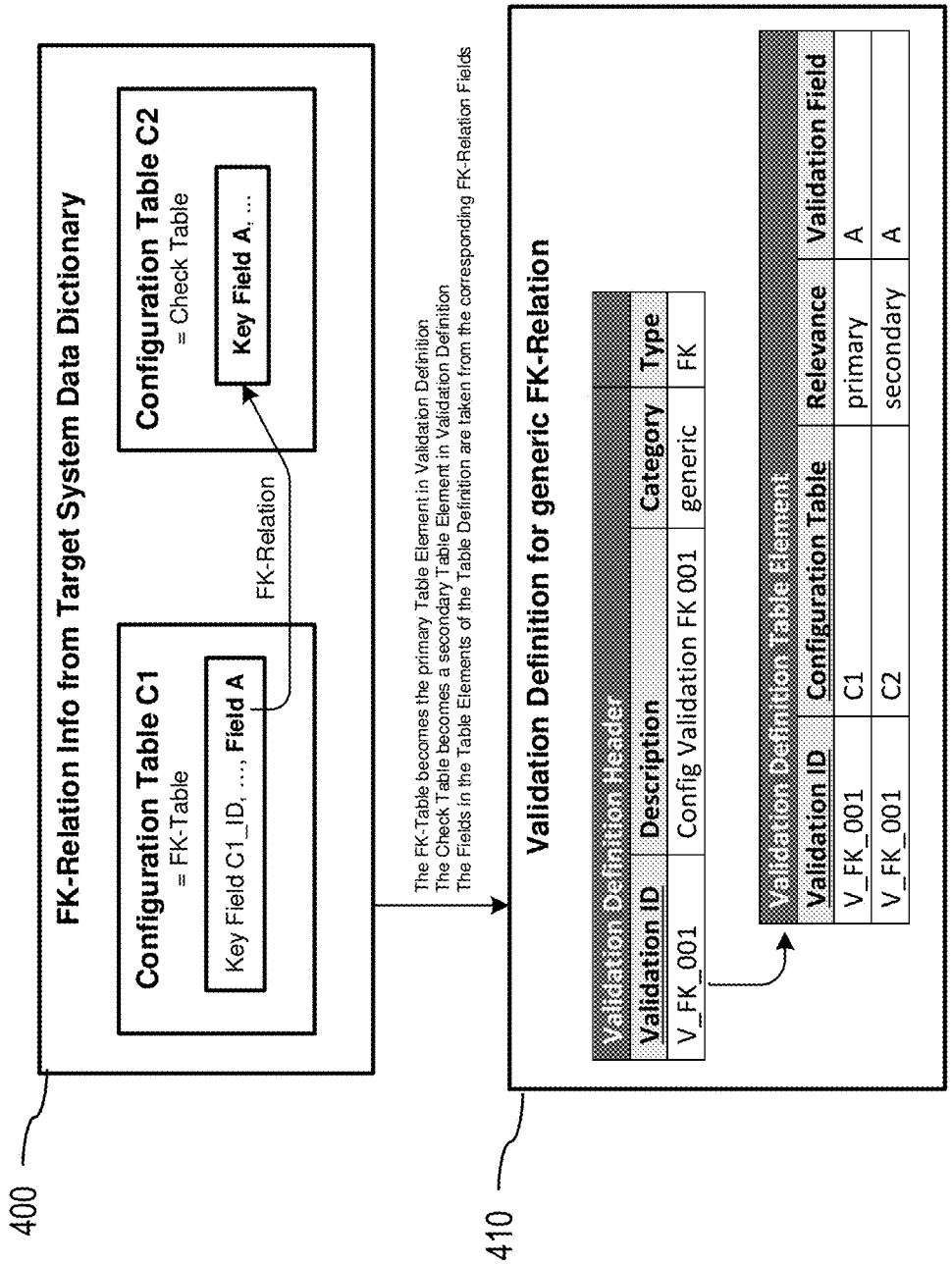
FIG. 4A illustrates a foreign-key relation and shows validation definition generation.

FIG. 4A illustrates a simple FK relation 400 and shows the validation definition generation for a simple FK-Relation. For a given configuration table C1 (e.g., sometimes referred to as a primary table or a first table), a key field can include a field (e.g., field A), which has a foreign key relation to a key field of a second configuration table C2 (e.g., sometimes referred to as a secondary table or second table) such that the configuration table C1 depends upon the second configuration table C2. Thus in this instance, the validation definition generation would be as shown at 410, where the relevance column in the validation definition table element indicates that table C1 is a primary table and C2 is a secondary table, which indicates that C1 depends upon C2.

Figure 4B:
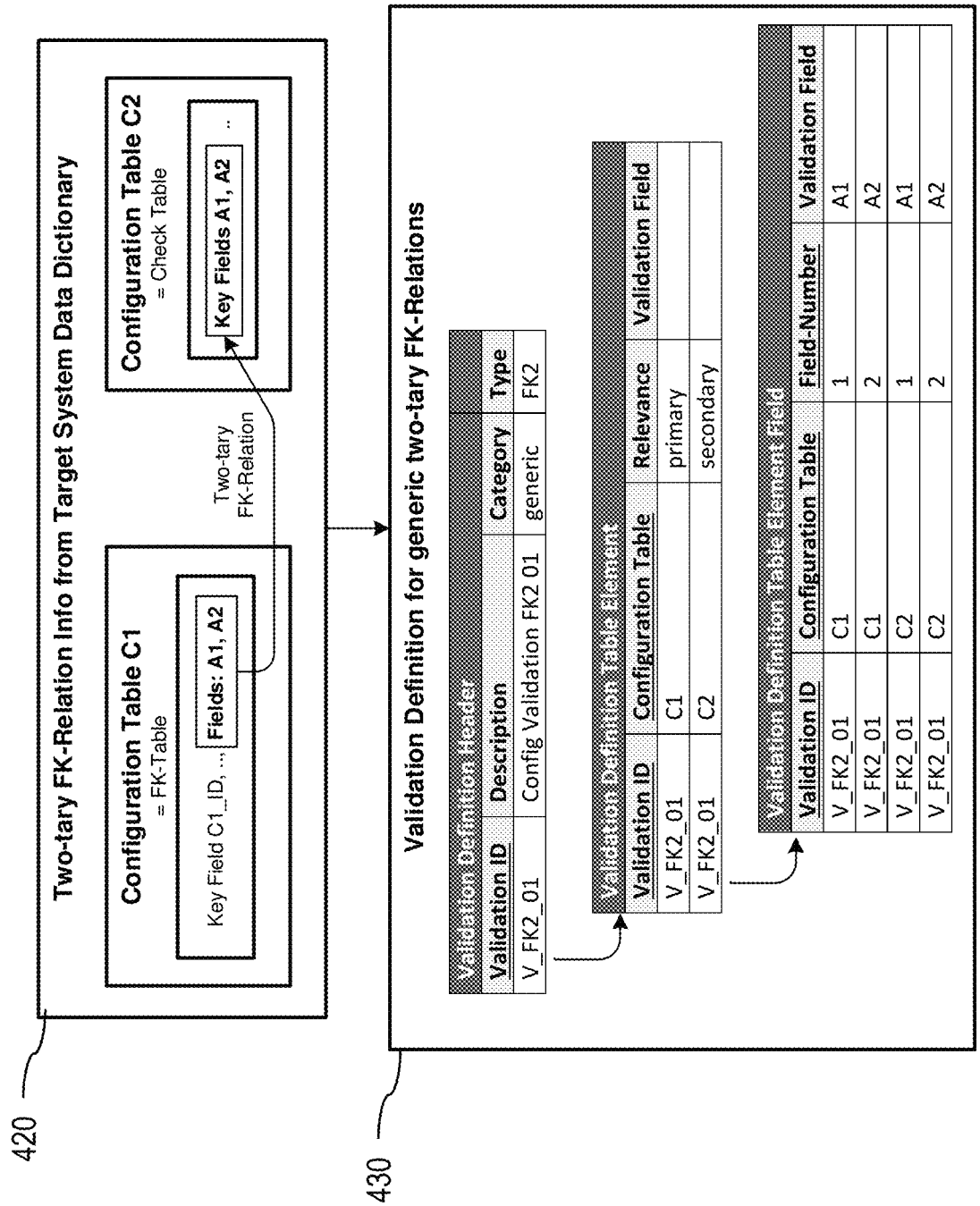
FIG. 4B illustrates a two-tary foreign-key relation.

While the example illustrated in FIG. 4A is for a simple FK-relation, n-tary FK relations are possible. For example, as illustrated in FIG. 4B, there can be a two-tary FK relation 420. The corresponding validation definition for a generic two-tary FK relations is shown at 430. In case of an n-tary FK-Relations, where multiple fields in the FK-Table need to be equal to accordingly associated multiple fields in the check-table, an extension can be obtained through an additional validation definition table, which is on field-level and which allows the needed field association as shown in FIG. 4B.

Figure 5:
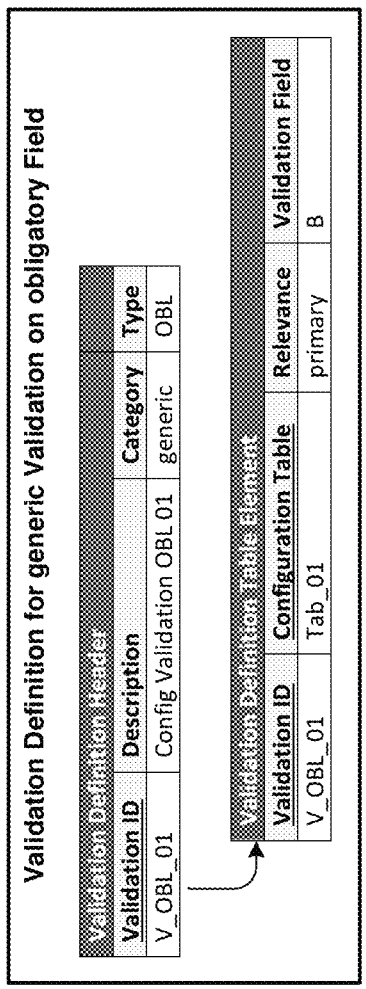
FIG. 5 illustrates an example validation definition for a generic validation on an obligatory field.

For obligatory fields the generation of the validation definition can include utilizing one table, which is a primary table, and which contains the obligatory field, which is set as a validation field. For example, FIG. 5 illustrates an example validation definition 500 for a generic validation on an obligatory field. Field B of table Tab_01 is obligatory.

Figure 6:
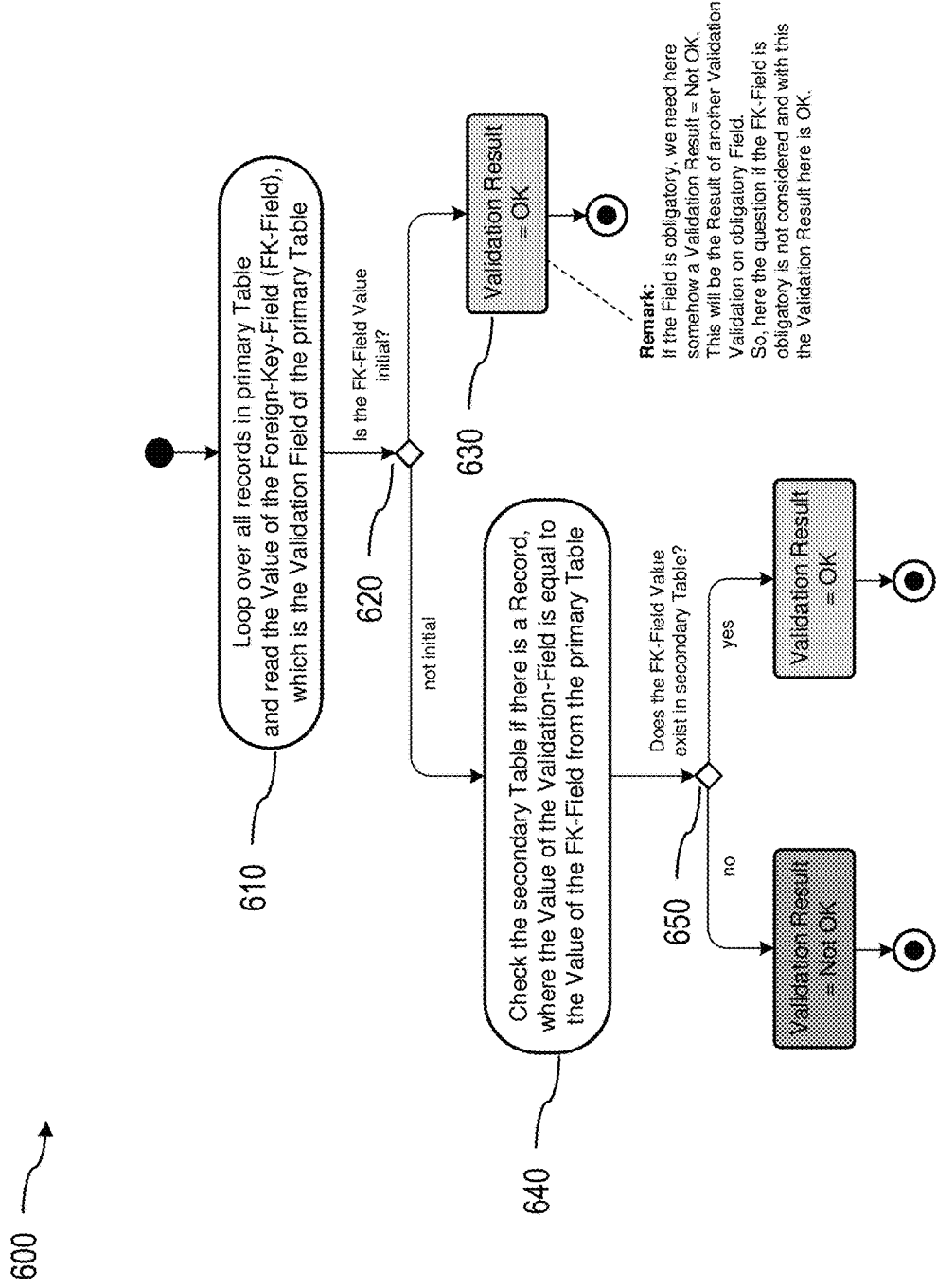
FIG. 6 is a process flow diagram illustrating an example generic execution of a validation including a foreign-key relation.

FIG. 6 is a process flow diagram illustrating an example generic execution 600 of a validation including a FK-Relation. The example generic execution utilizes the determined validation definitions.

At 610, all records are looped over in the primary table and the value of the FK-field, which is the validation field of the primary table, is read. At 620, it is determined if the FK-field value is initial (e.g., unchanged). If so, then at 630 the validation result can be determined and provided. If the FK-field value is not initial, then at 640 the secondary table(s) are checked to determine if there is a record where the value of the validation field is equal to the value of the FK-field from the primary table.

At 650, it is determined whether the FK-field value exists in the secondary table. If so, then the validation result can be determined as valid and provided. If not, then the validation result can be determined as not valid and the validation result can be provided.

For obligatory fields, the generic execution can include determining if a value of a validation field (e.g., Field B of FIG. 5) of the primary table (Tab_01 of FIG. 5) is initial, then the validation result is Not OK (e.g., not valid), otherwise it is OK (e.g., valid).

Figure 10:
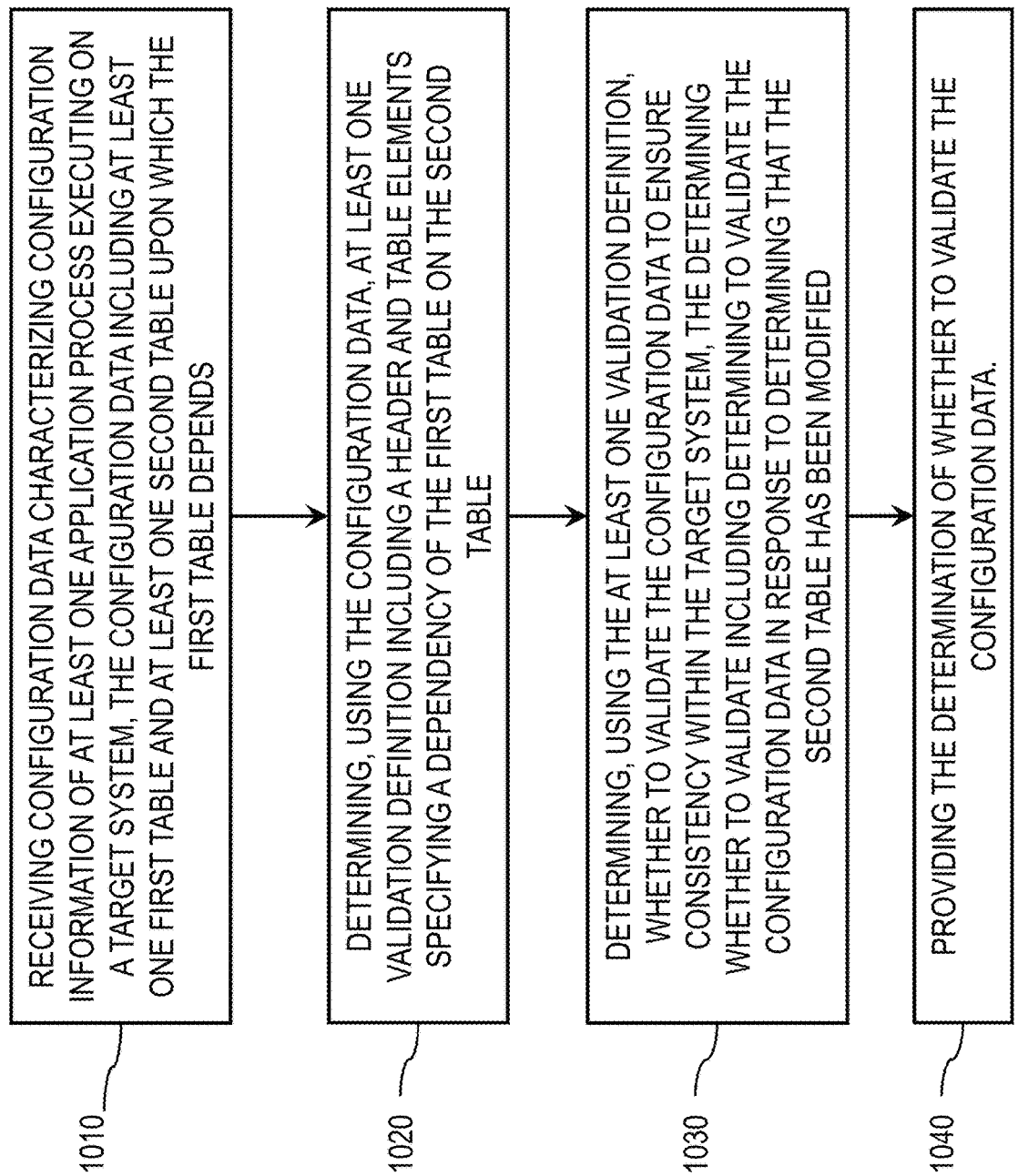
FIG. 10 is a process flow diagram illustrating an example process of determining whether to validate confirmation data to ensure consistency within a target system according to some implementations of the current subject matter.

FIG. 10 is a process flow diagram illustrating an example process 1000 of determining whether to validate configuration data to ensure consistency within a target system. By utilizing a validation definition that specifies dependencies (e.g., relevance) of the configuration tables, validation can be performed without having to validate all possible configuration data of a given system. The example process 1000 may be implemented by, for example, the configuration consistency validation processor 100 of FIG. 1.

At 1010, configuration data is received characterizing configuration information of at least one application process executing on a target system. The configuration data includes at least one first table and at least one second table upon which the first table depends. For example, the first table can include a foreign-key relation to the second table. The receiving can be performed prior to transmission of the configuration data to the target system for application of the configuration data to the target system. The at least one application process can include an application business process and the target system can be executing a plurality of application business processes.

At 1020, at least one validation definition can be determined using the configuration data. The validation definition can include a header and table elements specifying the dependency of the first table on the second table. For example, the validation definition can include a definition as described above with respect to FIG. 2.

In some implementations, the validation definition characterizes a type of validation as associated with a foreign-key relation or an obligatory field. The validation definition can characterize a relevance of the at least one first table as primary and the at least one second table as secondary. The at least one first table can include key fields and non-key fields as column names and the configuration information as records in the at least one first table.

At 1030, whether to validate the configuration data to ensure consistency within the target system can be determined using the at least one validation definition. The determining whether to validate can including determining to validate the configuration data in response to determining that the second table has been modified.

In some implementations, the determining whether to validate can include determining a delta between the received configuration data and last validated configuration data. First validations can be selected where a respective first table of configuration data is in scope. Second validations can be selected from the selected first validations. The second validations that are selected can be those that are relevant from the first table, the second table, and the delta between the received configuration data and last validated configuration data. Second validations can be relevant when they include dependent tables.

In some implementations, determining whether to validate can include determining a delta between the received configuration data and last validated configuration data. First validations can be selected where a configuration table from the validation definition is in a set of configuration tables characterized by the delta between the received configuration data and last validated configuration data. Second validations can be selected from the first validation and which include a respective first table of a respective validation definition that is included in the received configuration data.

At 1040, the determination of whether to validate the configuration data can provided. Providing can include, for example, validating, based on the determination of whether to validate the configuration data, the configuration data. Providing can include deploying the configuration data to the target system.

In some implementations, the receiving, the determining of the at least one validation definition, and the determining of whether to validate the configuration data are performed by a configuration consistency validation processor forming part of a business configuration framework that includes an associated persistency of all configuration data of the target system. The business configuration framework can be providing consistency of configuration data across some or all application business processes in an enterprise software system. An example of a configuration consistency validation processor is illustrated and described above with respect to FIG. 1.

An example of a FK-Validation of assigned rejection reasons to sales document types/organizations is described. Rejection reasons for sales documents can be defined including control parameters in table TVAG, as illustrated in FIG. 7A at 710, which is a screen shot of a business management system that enables a user to define reasons for rejection of a sales document. The documents can then be assigned to sales document types and/or sales organizations in table TVAG_AUART_VKO, for example as illustrated in FIG. 7A at 720. The to-be-assigned rejection reason field ABGRU in table TVAG_AUART_VKO has an FK-Relation to the rejection reason definition in table TVAG Field ABGRU for which a validation is needed. FIG. 7B illustrates an example validation definition 730 for the above-described example business case.

Figure 8:
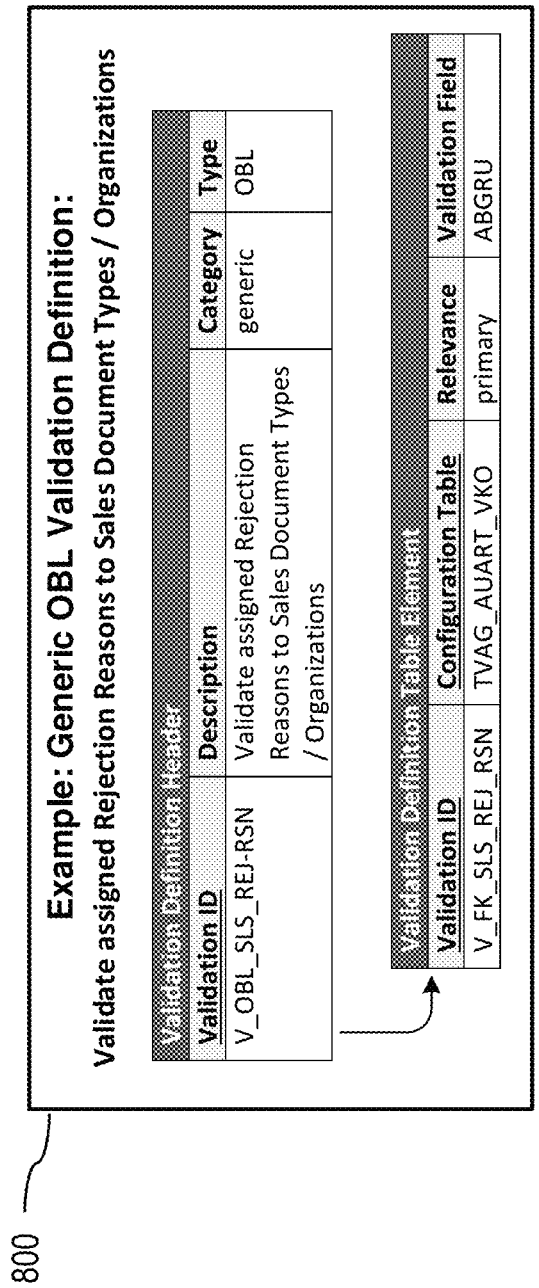
FIG. 8 illustrates another example validation definition.

With respect to obligatory fields, they can be often used and in considering the example above, the to-be-assigned rejection reason field ABGRU in table TVAG_AUART_VKO may not be initial. FIG. 8 illustrates the validation definition 800 for this example.

With respect to example specific coded validations, consider an example of validate document type in settings for calling global trade services (GTS). Settings for calling global trade services can be persisted in a configuration table/SAPSLL/TLER3B. Depending on an application level (Field APEVS_R3), document types (Field BARVS_R3), for which certain GTS-Services shall be performed, can be chosen according to the selected application level and then different control settings for the to-be-performed GTS-Services can be done for the application level/document type combination. For example, FIG. 9A illustrates an example screenshot from enterprise business management software system of this example, and FIG. 9B illustrates a validation definition according to this example.

With respect to validation, the document types (Field BARVS_R3) are from different defining configuration tables depending on the selected application level (Field APEVS_R3) with the following logic. Consider the different cases for the values of the application level with the according logic of allowed document types:
- E. Case: Application Level=SD0A (=Dispatch/Export: Sales Document). Allowed Document Types are all Values of Key-Field AUART in Table TVAK (=Definition of all Sales Documents).
- F. Case: Application Level=SD0B (=Dispatch/Export: Outbound Delivery Document). Allowed Document Types are all Values of Key-Field in Table TVLK (=Definition of all Delivery Documents), from those records, where the value of Field VBTYP is not equal to 7 (=Delivery/Shipping Notification).
- G. Case: Application Level=SD0C (=Dispatch/Export: Billing Document). Allowed Document Types are all Values of Key-Field FKART in Table TVFK (=Definition of all Billing Document Types).
- H. Case: Application Level=MM0A (=Receipt/Import: Purchasing Document). Allowed Document Types are the concatenation of both values of the Key Fields BSTYP and BSART from the Table T161 (=Definition of all Purchase Order Types).
- I. Case: Application Level=MM0B (=Receipt/Import: Inbound Delivery Document). Allowed Document Types are all Values of Key-Field in Table TVLK (=Definition of all Delivery Documents), from those records, where the value of Field VBTYP is equal to 7 (=Delivery/Shipping Notification).
- J. Case: Application Level=MM0C (=Receipt/Import: Material Document). Allowed Document Types are the concatenation of both values of the Key Fields BWART and KZBEW from the Table T156Q (=Definition of all Material Movement Types).

If the document type is entered directly and the document type is not allowed, then an according warning is displayed and the configuration (e.g., the GTS-Service) will not work for this document type.

Although a few variations have been described in detail above, other modifications or additions are possible. For example, consistency validations can vary including generic FK-Relation validation including Simple and n-tary FK-relation; refined generic FK-Relation validation filtering on allowed check-table entries through a given constant value of one given check table field; conditional FK-relations; simple validation of mandatory fields; and specifically coded validation with or without dependency of secondary Tables. In some implementations, generic namespace validations can utilize values that need to be inside a defined namespace, which typically depends on the configuration provider/user, which can be the software provider, a partner of the software provider or the customer. Typically these entities receive different namespaces to prevent overwriting of configuration data during upgrades. The namespaces can be provided as metadata, so that the validation is generically coded on these metadata.

In addition, follow-ups in case of errors/exceptions can vary. For example, some implementations can provide complete information about validation error/exception to the user, for example, which table rows and which field values have caused the error/exception. There can be different approaches regarding saving in case of validation exception/error including preventing the saving and providing an error message to the user; allowing the saving and persist an error message, exception or issue and show it to the user (also providing an list of such errors or issues to provide an overview to the users); letting the user decide if he save with errors or does not save; preventing deployment to the target systems in case of errors/exceptions.

In the case that scoping functionality is provided from the configuration framework (which is typically the case, as described above, in order to allow flexible customer decisions on scope, for example by selecting business processes and scenarios including selecting different dimensions as countries and industries or deciding on business options), some implementations can perform additional validation in the case of missing entries in a certain configuration table causing validation errors/exceptions. This can include checking if the missing entry exist in the unselected reference configuration content of the software provider, whereby the reference configuration content is the complete set of pre-configuration, which is available for the customers. If the missing entry exists in the reference configuration content, then this would be an important information for the customer or for an employee of the software provider, because then it is very likely, that the error/exception appeared because of a missing selection in scoping. This situation can be prevented from the software provider, however in case of business software with a high amount of configuration data due to required flexibility, these errors/exceptions are likely.

The subject matter described herein provides many technical advantages. For example, the current subject matter can enable a unified approach to have formalized validation input data (in the validation definition), which can allow for completeness in determining the required validations, which need to be executed. With this, some implementations of the current subject matter allows an early very high degree of business configuration consistency, before the configuration data are deployed into the application systems.

Some implementations of the current subject matter can provide advantages during the authoring process, which is described above. There can be automated processes in authoring to vary different pre-defined scoping selections and run all consistency validations for every of the given scoping selections to validate the completeness of scoping before the customers starts to use it. Typically, there is a large number independent scoping possibilities in configuration frameworks, so that the number of possible combinations is also very large. So, it is unlikely that all combinations can run to validate completeness of consistency for all possible scoping combinations. Some implementations of the current subject matter can include running a consistency validation for many pre-defined scoping combinations during or after authoring of the pre-configuration (e.g., design-time); and executing the validations at run-time, when the customers are doing the scoping according to their needs.

Some implementations can improve overall system performance, for example, because in some implementations, only those validation which are required to be executed (especially important in change-mode, for example, during finetuning) are executed.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:
   receiving configuration data, by at least one hardware data processor, characterizing configuration information of at least one application process executing on a target system, the configuration data including at least one first table and at least one second table upon which the first table depends, the receiving performed prior to transmission of the configuration data to the target system for application of the configuration data to the target system;
   determining, using the configuration data and the at least one hardware data processor, at least one validation definition including a header and table elements specifying a dependency of the first table on the second table;
   determining, using the at least one validation definition and the at least one hardware data processor, whether to validate the configuration data to ensure consistency within the target system, the determining whether to validate including determining to validate the configuration data in response to determining that the second table has been modified; and
   providing, by the at least one data processor, the determination of whether to validate the configuration data.

2. The method of claim 1, wherein the determining whether to validate includes:
   determining a delta between the received configuration data and last validated configuration data;
   selecting first validations where a respective first table of configuration data is in scope;
   selecting, from the selected first validations, second validations that are relevant from the first table, the second table, and the delta between the received configuration data and last validated configuration data, wherein second validations are relevant when they include dependent tables.

3. The method of claim 1, wherein the determining whether to validate includes:
   determining a delta between the received configuration data and last validated configuration data;
   selecting first validations where a configuration table from the validation definition is in a set of configuration tables characterized by the delta between the received configuration data and last validated configuration data; and selecting second validations from the first validation and which include a respective first table of a respective validation definition that is included in the received configuration data.

4. The method of claim 1, wherein the validation definition characterizes a type of validation as associated with a foreign-key relation or an obligatory field, and the validation definition characterizes a relevance of the at least one first table as primary and the at least one second table as secondary, the at least one first table including key fields and non-key fields as column names and the configuration information as records in the at least one first table.

5. The method of claim 1, wherein the at least one application process includes an application business process and the target system is executing a plurality of application business processes.

6. The method of claim 1, wherein the receiving, the determining of the at least one validation definition, and the determining of whether to validate the configuration data is performed by a configuration consistency validation processor forming part of a business configuration framework that includes an associated persistency of all configuration data of the target system, the business configuration framework providing consistency of configuration data across all application business processes in an enterprise software system.

7. The method of claim 1, further comprising:
validating, based on the determination of whether to validate the configuration data, the configuration data; and
deploying the configuration data to the target system.

8. The method of claim 1, wherein the at least one first table includes a foreign-key relationship with the at least one second table.

9. A system comprising:
at least one hardware data processor; and
memory storing executable instructions which, when executed by the at least one hardware data processor causes the at least one hardware data processor to perform operations comprising:
receiving configuration data characterizing configuration information of at least one application process executing on a target system, the configuration data including at least one first table and at least one second table upon which the first table depends, the receiving performed prior to transmission of the configuration data to the target system for application of the configuration data to the target system;
determining, using the configuration data, at least one validation definition including a header and table elements specifying a dependency of the first table on the second table;
determining, using the at least one validation definition, whether to validate the configuration data to ensure consistency within the target system, the determining whether to validate including determining to validate the configuration data in response to determining that the second table has been modified; and
providing the determination of whether to validate the configuration data.

10. The system of claim 9, wherein the determining whether to validate includes:
determining a delta between the received configuration data and last validated configuration data;

selecting first validations where a respective first table of configuration data is in scope;
selecting, from the selected first validations, second validations that are relevant from the first table, the second table, and the delta between the received configuration data and last validated configuration data, wherein second validations are relevant when they include dependent tables.

11. The system of claim 9, wherein the determining whether to validate includes:
determining a delta between the received configuration data and last validated configuration data;
selecting first validations where a configuration table from the validation definition is in a set of configuration tables characterized by the delta between the received configuration data and last validated configuration data; and
selecting second validations from the first validation and which include a respective first table of a respective validation definition that is included in the received configuration data.

12. The system of claim 9, wherein the validation definition characterizes a type of validation as associated with a foreign-key relation or an obligatory field, and the validation definition characterizes a relevance of the at least one first table as primary and the at least one second table as secondary, the at least one first table including key fields and non-key fields as column names and the configuration information as records in the at least one first table.

13. The system of claim 9, wherein the at least one application process includes an application business process and the target system is executing a plurality of application business processes.

14. The system of claim 9, wherein the receiving, the determining of the at least one validation definition, and the determining of whether to validate the configuration data is performed by a configuration consistency validation processor forming part of a business configuration framework that includes an associated persistency of all configuration data of the target system, the business configuration framework providing consistency of configuration data across all application business processes in an enterprise software system.

15. The system of claim 9, the operations further comprising:
validating, based on the determination of whether to validate the configuration data, the configuration data; and
deploying the configuration data to the target system.

16. The system of claim 9, wherein the at least one first table includes a foreign-key relationship with the at least one second table.

17. A non-transitory computer readable medium storing computer executable instructions which, when executed by at least one hardware data processor forming part of at least one computing system, causes the at least one hardware data processor to perform operations comprising:
receiving configuration data characterizing configuration information of at least one application process executing on a target system, the configuration data including at least one first table and at least one second table upon which the first table depends, the receiving performed prior to transmission of the configuration data to the target system for application of the configuration data to the target system;

determining, using the configuration data, at least one validation definition including a header and table elements specifying a dependency of the first table on the second table;

determining, using the at least one validation definition, whether to validate the configuration data to ensure consistency within the target system, the determining whether to validate including determining to validate the configuration data in response to determining that the second table has been modified; and providing the determination of whether to validate the configuration data.

18. The non-transitory computer readable medium of claim 17, wherein the determining whether to validate includes:

determining a delta between the received configuration data and last validated configuration data;

selecting first validations where a respective first table of configuration data is in scope;

selecting, from the selected first validations, second validations that are relevant from the first table, the second table, and the delta between the received configuration data and last validated configuration data, wherein second validations are relevant when they include dependent tables.

19. The non-transitory computer readable medium of claim 17, wherein the determining whether to validate includes:

determining a delta between the received configuration data and last validated configuration data;

selecting first validations where a configuration table from the validation definition is in a set of configuration tables characterized by the delta between the received configuration data and last validated configuration data; and selecting second validations from the first validation and which include a respective first table of a respective validation definition that is included in the received configuration data.

20. The non-transitory computer readable medium of claim 17, wherein the validation definition characterizes a type of validation as associated with a foreign-key relation or an obligatory field, and the validation definition characterizes a relevance of the at least one first table as primary and the at least one second table as secondary, the at least one first table including key fields and non-key fields as column names and the configuration information as records in the at least one first table.

* * * * *